(12) United States Patent
Sakugawa et al.

(10) Patent No.: US 8,200,391 B2
(45) Date of Patent: Jun. 12, 2012

(54) RUNNING CONTROL APPARATUS FOR VEHICLE

(75) Inventors: Jun Sakugawa, Gotenba (JP); Shiro Monzaki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1331 days.

(21) Appl. No.: 11/794,123

(22) PCT Filed: May 15, 2006

(86) PCT No.: PCT/IB2006/001258
§ 371 (c)(1),
(2), (4) Date: Jun. 26, 2007

(87) PCT Pub. No.: WO2006/123215
PCT Pub. Date: Nov. 23, 2006

(65) Prior Publication Data
US 2008/0114511 A1    May 15, 2008

(30) Foreign Application Priority Data

May 18, 2005 (JP) ................................. 2005-144959

(51) Int. Cl.
B62D 6/00 (2006.01)
(52) U.S. Cl. .............. 701/41; 701/70; 180/6.2; 303/146
(58) Field of Classification Search .................... 701/41, 701/70, 72, 79, 80, 82, 83; 180/6.2, 197, 180/199; 303/140, 146, 163, 177
See application file for complete search history.

(56) References Cited

U.S. PATENT DOCUMENTS

| 5,774,819 | A | * | 6/1998 | Yamamoto et al. | ............. 701/41 |
| 5,865,265 | A | * | 2/1999 | Matsumoto | ................... 180/169 |
| 5,913,910 | A | | 6/1999 | Ochi et al. | |
| 6,442,469 | B1 | | 8/2002 | Matsuno | |
| 6,622,074 | B1 | * | 9/2003 | Coelingh et al. | ................. 701/48 |

(Continued)

FOREIGN PATENT DOCUMENTS

DE    102 36 734 A1    2/2004
(Continued)

OTHER PUBLICATIONS

Japanese Office Action issued in Japanese Patent Application No. 2008-205517 on Jun. 8, 2010 (with translation).

(Continued)

*Primary Examiner* — Thomas Black
*Assistant Examiner* — Ce Li
(74) *Attorney, Agent, or Firm* — Oliff & Berridge, PLC

(57) ABSTRACT

A target yaw moment Mt of a vehicle is calculated to make the vehicle run stably (S20). The change rate φd of an accelerator pedal operation amount φ is calculated (S30). Based on the change rate φd, a proportion ωs1 for a steering angle control is calculated (S50). When the change rate φd is a positive value, the proportion ωs1 gradually increases as the change rate φd increases. A proportion ωb for a braking force control is calculated by subtracting the proportion ωs1 from 1 (1−ωs1) (S60). Based on the proportions ωs1 and ωb, a target yaw moment Mts for the steering angle control and a target yaw moment Mtb for the braking force control are calculated (S70). A steering-angle changing device (24) and a braking device (36) are controlled based on the target yaw moments Mts and Mtb, respectively (S400 to S430).

17 Claims, 13 Drawing Sheets

U.S. PATENT DOCUMENTS

| | | |
|---|---|---|
| 2003/0060960 A1 | 3/2003 | Hartmann |
| 2003/0171865 A1* | 9/2003 | Moser et al. .................... 701/48 |
| 2004/0016594 A1* | 1/2004 | Yasui et al. .................... 180/446 |
| 2005/0125131 A1* | 6/2005 | Kato et al. ...................... 701/70 |
| 2005/0137772 A1 | 6/2005 | Smakman et al. |
| 2005/0140322 A1* | 6/2005 | Itakura .......................... 318/466 |
| 2005/0222744 A1* | 10/2005 | Sakata ............................. 701/70 |

FOREIGN PATENT DOCUMENTS

| | | |
|---|---|---|
| DE | 103 28 685 A1 | 1/2005 |
| DE | 10328685 * | 1/2005 |
| EP | 1 357 008 A2 | 10/2003 |
| EP | 1 369 288 A2 | 12/2003 |
| EP | 1 520 761 A2 | 4/2005 |
| JP | A 04-266538 | 9/1992 |
| JP | A-10-310042 | 11/1998 |
| JP | A-11-310146 | 11/1999 |
| JP | A-2000-25629 | 1/2000 |
| JP | A-2001-310719 | 11/2001 |
| JP | 2003-175749 * | 6/2003 |
| JP | A-2003-159966 | 6/2003 |
| JP | A 2003-175749 | 6/2003 |
| JP | A-2004-75013 | 3/2004 |
| JP | A-2004-345482 | 12/2004 |
| JP | A-2005-96567 | 4/2005 |
| JP | A-2005-96710 | 4/2005 |
| JP | A-2005-112007 | 4/2005 |
| WO | WO 01/89898 A1 | 11/2001 |
| WO | WO 03/084799 A1 | 10/2003 |

OTHER PUBLICATIONS

Japanese Office Action issued in Japanese Patent Application No. 2004-091509 on Mar. 6, 2007 (with translation).

* cited by examiner

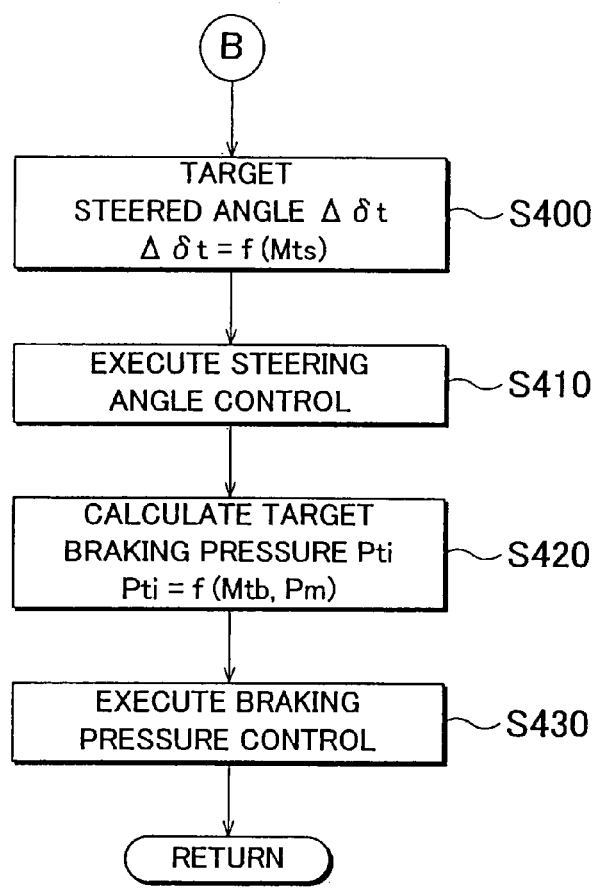

F I G . 7B
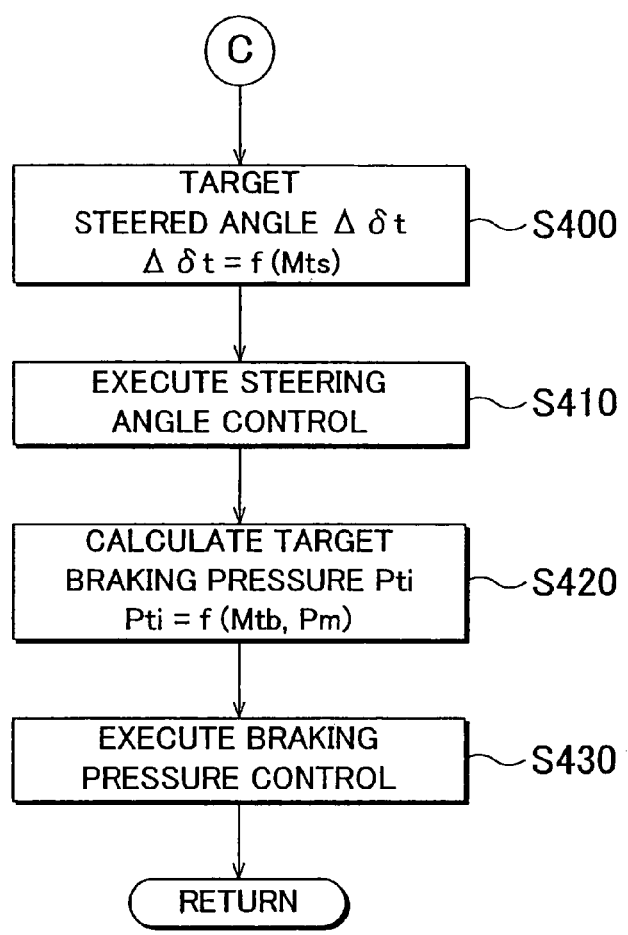

RUNNING CONTROL APPARATUS FOR VEHICLE

BACKGROUND OF THE INVENTION

1. Field of the Invention

The invention relates to a running control apparatus for a vehicle. More specifically, the invention relates to a running control apparatus that controls the running movement of a vehicle by controlling the steering angle of a steering wheel and the braking/driving force for the wheel.

2. Description of the Related Art

Japanese Patent Application Publication No. JP-A-2003-175749 describes an example of a running control apparatus for a vehicle such as an automobile. The running control apparatus includes steering means, braking/driving force control means, calculation means, division means, and control means. The steering means steers a steering wheel, independently of steering operation performed by a driver. The braking/driving force control means controls the braking/driving force for each wheel. The calculation means calculates a target turning control amount, such as a target yaw moment of the vehicle. The division means divides the target turning control amount into a target turning control amount allocated to the control of the steering angle of the steering wheel and a target turning control amount allocated to the control of the braking/driving force in predetermined proportions. The control means controls the steering means based on the target turning control amount allocated to the control of the steering angle of the steering wheel, and controls the braking/driving force control means based on the target turning control amount allocated to the control of the braking/driving force.

In general, the running movement of the vehicle can be controlled by steering the steering wheel using the steering means, without accelerating or decelerating the vehicle. However, the vehicle moves in slower response to driver's driving operation than when the running movement is controlled by controlling the braking/driving force. Also, it is difficult to deal with understeer of the vehicle. In contrast, when the running movement of the vehicle is controlled by controlling the braking/driving force, the vehicle moves in quicker response to the driver's driving operation than when the running movement is controlled by steering the steering wheel. However, the vehicle speed needs to be changed, that is, the vehicle needs to be accelerated or decelerated.

With the aforementioned running control apparatus, the target turning control amount is divided into the target turning control amount allocated to the control of the steering angle of the steering wheel and the target turning control amount allocated to the control of the braking/driving force, in the predetermined proportions. The proportions are set based on, for example, the responsiveness and characteristics of the steering means and the braking/driving force control means. Therefore, as compared to the case where the running movement of the vehicle is controlled only by controlling the steering angle of the steering wheel or only by controlling the braking/driving force, the running movement of the vehicle can be appropriately and effectively controlled.

However, in the aforementioned running control apparatus, the proportions are set based on, for example, the responsiveness and characteristics of the steering means and the braking/driving force control means (responsiveness and characteristics for obtaining the target turning control amount), without taking into account the running mode desired by an occupant or the intention of a driver. Therefore, the target turning control amount cannot be appropriately allocated to the steering means and to the braking/driving force control means according to the running mode desired by the occupant and the intention of the driver.

DISCLOSURE OF THE INVENTION

The invention is made in view of the aforementioned problem in the conventional running control apparatus that includes steering means for steering a steering wheel independently of steering operation performed by a driver, and braking/driving force control means for controlling braking/driving force for each wheel. An object of the invention is to appropriately allocate a target turning control amount to steering means and braking/driving force control means according to the driving mode desired by an occupant and the intention of a driver by taking into account the driving mode desired by the occupant and the intention of the driver when the target turning control amount is divided to a target turning control amount allocated to the control of the steering angle of a steering wheel and a target turning control amount allocated to the control of braking/driving force, whereby the running movement of the vehicle is controlled appropriately and effectively.

A first aspect of the invention relates to a running control apparatus for a vehicle that includes steering means, braking/driving force control means, calculation means, division means, and control means. The steering means steers a steering wheel independently of steering operation performed by a driver. The braking/driving force control means controls the braking/driving force for each wheel. The calculation means calculates a target turning control amount of a vehicle to stabilize the running movement of the vehicle. The division means divides the target turning control amount into a target turning control amount allocated to the control of the steering angle of the steering wheel and a target turning control amount allocated to the control of the braking/driving force in predetermined proportions. The control means controls the steering means based on the target turning control amount allocated to the control of the steering angle of the steering wheel and controls the braking/driving force control means based on the target turning control amount allocated to the control of the braking/driving force. The running control apparatus further includes detection means for detecting the amount of acceleration operation performed by the driver. The division means increases the proportion of the target turning control amount allocated to the control of the steering angle of the steering wheel, as the rate of increase in the amount of acceleration operation increases.

In the first aspect of the invention, the amount of acceleration operation performed by the driver is detected. The proportion of the target turning control amount allocated to the control of the steering angle of the steering wheel is increased as the rate of increase in the amount of acceleration operation performed by the driver increases. Therefore, when the driver intends to accelerate the vehicle to a greater extent, the proportion of the target turning control amount allocated to the control of the steering angle of the steering wheel is increased. As a result, the vehicle runs stably while preventing deterioration of the acceleration performance of the vehicle due to the control of the braking force. When the driver intends to accelerate the vehicle to a smaller extent, the proportion of the target turning control amount allocated to the control of the braking force is increased. As a result, the vehicle can be effectively stabilized in quick response to the driver's driving operation. Thus, the target turning control amount can be divided according to the driving mode desired by the occupant and the intention of the driver, whereby the running movement of the vehicle can be effectively controlled.

A second aspect of the invention relates to a running control apparatus for a vehicle that includes steering means, braking/driving force control means, calculation means, division means, and control means. The steering means steers a steering wheel independently of steering operation performed by a driver. The braking/driving force control means controls braking/driving force for each wheel. The calculation means calculates a target turning control amount of a vehicle to stabilize the running movement of the vehicle. The division means divides the target turning control amount into a target turning control amount allocated to the control of the steering angle of the steering wheel and a target turning control amount allocated to the control of the braking/driving force in predetermined proportions. The control means controls the steering means based on the target turning control amount allocated to the control of the steering angle of the steering wheel and controls braking/driving force control means based on the target turning control amount allocated to the control of the braking/driving force. The running control apparatus further includes setting means operated by the driver, which sets a driving mode to a first driving mode in which the vehicle moves in quick response to driving operation performed by the driver, or a second driving mode in which the vehicle moves in slower response to the driving operation performed by the driver than in the first driving mode. When the setting means sets the driving mode to the first driving mode, the division means increases the proportion of the target turning control amount allocated to the control of the turning angle of the steering wheel, as compared to when the setting means sets the driving mode to the second driving mode.

In the second aspect, when the driver operates the setting means, the driving mode is set to the first driving mode in which the vehicle moves in quick response to the driving operation performed by the driver, or the second driving mode in which the vehicle moves in slower response to the driving operation than in the first driving mode. When the driving mode is set to the first driving mode, the proportion of the target turning control amount allocated to the control of the turning angle of the steering wheel is increased as compared to when the driving mode is set to the second driving mode. Therefore, the allocation of the target turning control amount to the steering angle control and to the braking force control is controlled based on whether the occupant wants the vehicle to move in quick response to the driver's driving operation. As a result, the allocation of the target turning control amount can be controlled according to the driving mode desired by the occupant and the intention of the driver.

A third aspect of the invention relates to a running control apparatus for a vehicle that includes steering means, braking/driving force control means, calculation means, division means, and control means. The steering means steers a steering wheel independently of steering operation performed by a driver. The braking/driving force control means controls braking/driving force for each wheel. The calculation means calculates a target turning control amount of a vehicle to stabilize the running movement of the vehicle. The division means divides the target turning control amount into a target turning control amount allocated to the control of the steering angle of the steering wheel and a target turning control amount allocated to the control of the braking/driving force in predetermined proportions. The control means controls the steering means based on the target turning control amount allocated to the control of the steering angle of the steering wheel and controls braking/driving force control means based on the target turning control amount allocated to the control of the braking/driving force. The running control apparatus further includes means for identifying the driver. The division means variably sets the proportions of the target turning control amount allocated to the control of the steering angle of the steering wheel and the target turning control amount allocated to the control of the braking/driving force, according to the identified driver.

In the third aspect, the driver is identified, and the proportions of the target turning control amount allocated to the control of the steering angle of the wheel and the target turning control amount allocated to the control of the braking/driving force are variably set according to the identified driver. Therefore, the target turning control amount allocated to the steering angle control and the target turning control amount allocated to the braking force control can be accurately controlled to the optimal values for each driver. Thus, the allocation of the target turning control amount can be appropriately controlled according to the driving mode desired by the occupant and the intention of the driver.

In the first aspect, the calculation means may decrease the target turning control amount as the rate of increase in the amount of acceleration operation increases.

With this configuration, the target turning control amount is decreased as the rate of increase in the amount of acceleration operation performed by the driver increases. Therefore, as the driver intends to accelerate the vehicle to a greater extent, the target turning control amount is decreased. As a result, when the driver intends to accelerate the vehicle to a great extent, the vehicle moves according to the driving mode desired by the occupant and the intention of the driver. When the driver intends to accelerate the vehicle to a small extent, the running movement of the vehicle can be effectively stabilized.

In the first aspect, when the amount of acceleration operation is not increased, the division means may set the proportion of the target turning control amount allocated to the control of the steering angle of the steering wheel to zero.

With this configuration, when the amount of acceleration is not increased, the proportion of the target steering control amount allocated to the control of the steering angle of the steering wheel is set to zero. That is, when the amount of acceleration operation performed by the driver is not increased, all of the target turning control amount is allocated to the braking force control. Accordingly, as compared to the case where the proportion of the target steering control amount allocated to the control of the steering angle of the steering wheel is set to a value greater than 0 and smaller than 1 even when the amount of acceleration operation performed by the driver is not increased, the running movement of the vehicle can be effectively stabilized in quick response to the driver's driving operation by controlling the turning control amount by the control of the braking force.

In the second aspect, when the setting means sets the driving mode to the first driving mode, the calculation means may decrease the target turning control amount as compared to when the setting means sets the driving mode to the second driving mode.

With this configuration, when the setting means sets the driving mode to the first driving mode, the target turning control amount is decreased as compared to when the setting means sets the driving mode to the second driving mode. Therefore, the target turning control amount is controlled based on whether the occupant wants the vehicle to move in quick response to the driver's driving operation. Thus, the target turning control amount can be controlled according to the driving mode desired by the occupant and the intention of the driver.

In the first aspect or the second aspect, the calculation means may decrease the target turning control amount as the rate of change in the acceleration operation performed by the driver increases.

In the third aspect, the proportions of the target turning control amount allocated to the control of the steering angle of the steering angle and the target turning control amount allocated to the control of the braking/driving force may be set for each driver in advance.

With this configuration, the proportions of the target turning control amount allocated to the control of the steering angle of the steering wheel and the target turning control amount allocated to the control of the braking/driving force are set for each driver in advance. Therefore, the target turning control amount allocated to the steering angle control and the target turning control amount allocated to the braking force control are controlled to the optimal values for each driver, without requiring complicated calculation and the like.

In the second aspect and the third aspect, the calculation means may decrease the target turning control amount as the rate of increase in the amount of acceleration operation performed by the driver increases.

With this configuration, the target turning control amount is decreased as the rate of increase in the amount of acceleration operation performed by the driver increases. Therefore, as the driver intends to accelerate the vehicle to a greater extent, the target turning control amount is decreased. As a result, when the driver intends to accelerate the vehicle to a great extent, the vehicle moves according to the driving mode desired by the occupant and the intention of the driver. When the driver intends to accelerate the vehicle to a small extent, the running movement of the vehicle can be effectively stabilized.

In each of the aforementioned aspects, the division means may control the proportions of the target turning control amount allocated to the control of the steering angle of the steering wheel and the target turning control amount allocated to the control of the braking/driving force, taking into account the condition of a road on which the vehicle is running.

With this configuration, the proportions of the target turning control amount allocated to the control of the steering angle of the steering wheel and the target turning control amount allocated to the control of the braking/driving force are controlled taking into account the condition of the road on which the vehicle is running. Therefore, as compared to the case where the condition of the road is not taken into account, the allocation of the target turning control amount can be controlled more appropriately.

In each of the aforementioned aspects, the calculation means may include means for calculating a target turning condition amount of the vehicle, and means for detecting an actual turning condition amount of the vehicle. The calculation means may calculate a target yaw moment of the vehicle as the target turning control amount, based on the deviation of the actual turning condition amount from the target turning condition amount.

With this configuration, the target turning condition amount of the vehicle is calculated, the actual turning condition amount of the vehicle is detected, and the target yaw moment of the vehicle is calculated as the target turning control amount, based on the deviation of the actual turning condition amount from the target turning condition amount. Therefore, the target yaw moment of the vehicle can be appropriately divided into a target yaw moment allocated to the control of the steering angle of the steering wheel and a target yaw moment allocated to the control of the braking/driving force, based on the condition of the vehicle running on the road.

In each of the aforementioned embodiments, the steering means may steer the steering wheel with respect to a steering operation element operated by the driver, thereby steering the steering wheel independently of the steering operation performed by the driver.

In each of the aforementioned embodiments, the braking/driving force control means may include means for individually controlling braking force for each wheel, and the braking/driving force control means may control the braking force for each wheel, thereby controlling the braking/driving force for each wheel.

In the first aspect, the division means may increase the proportion of the target turning control amount allocated to the control of the steering angle of the steering wheel as the rate of increase in the amount of acceleration operation increases.

The calculation means may decrease the target turning control amount allocated to the control of the steering angle of the steering wheel as the rate of increase in the amount of acceleration operation increases.

The calculation means may increase or decrease the target turning control amount according to the identified driver.

The condition of the road may be the degree of curve of the road.

The division means may increase the target turning control amount allocated to the control of the steering angle of the steering wheel, as the rate of increase in the amount of acceleration operation increases.

The division means may allocate all of the target yaw moment of the vehicle to the control of the braking/driving force when the target yaw moment of the vehicle is used to suppress drift-out of the vehicle.

The division means may increase the proportion of the target yaw moment allocated to the control of the braking/driving force as the target yaw moment of the vehicle increases when the target yaw moment is used to suppress spin of the vehicle.

The calculation means may increase or decrease the target turning control amount based on the condition of the road.

The condition of the road may include the conditions of the road classified based on the frequency with which the acceleration operation or steering operation is performed.

BRIEF DESCRIPTION OF THE DRAWINGS

FIGS. 6A and 6B are a flowchart showing a running control routine according to a fifth embodiment of the invention;

FIGS. 7A and 7B are a flowchart showing a running control routine according to a sixth embodiment of the invention;

DETAILED DESCRIPTION OF THE EXAMPLE EMBODIMENTS

Hereinafter, example embodiments of the invention will be described with reference to the drawings.

First Embodiment

Figure 1:
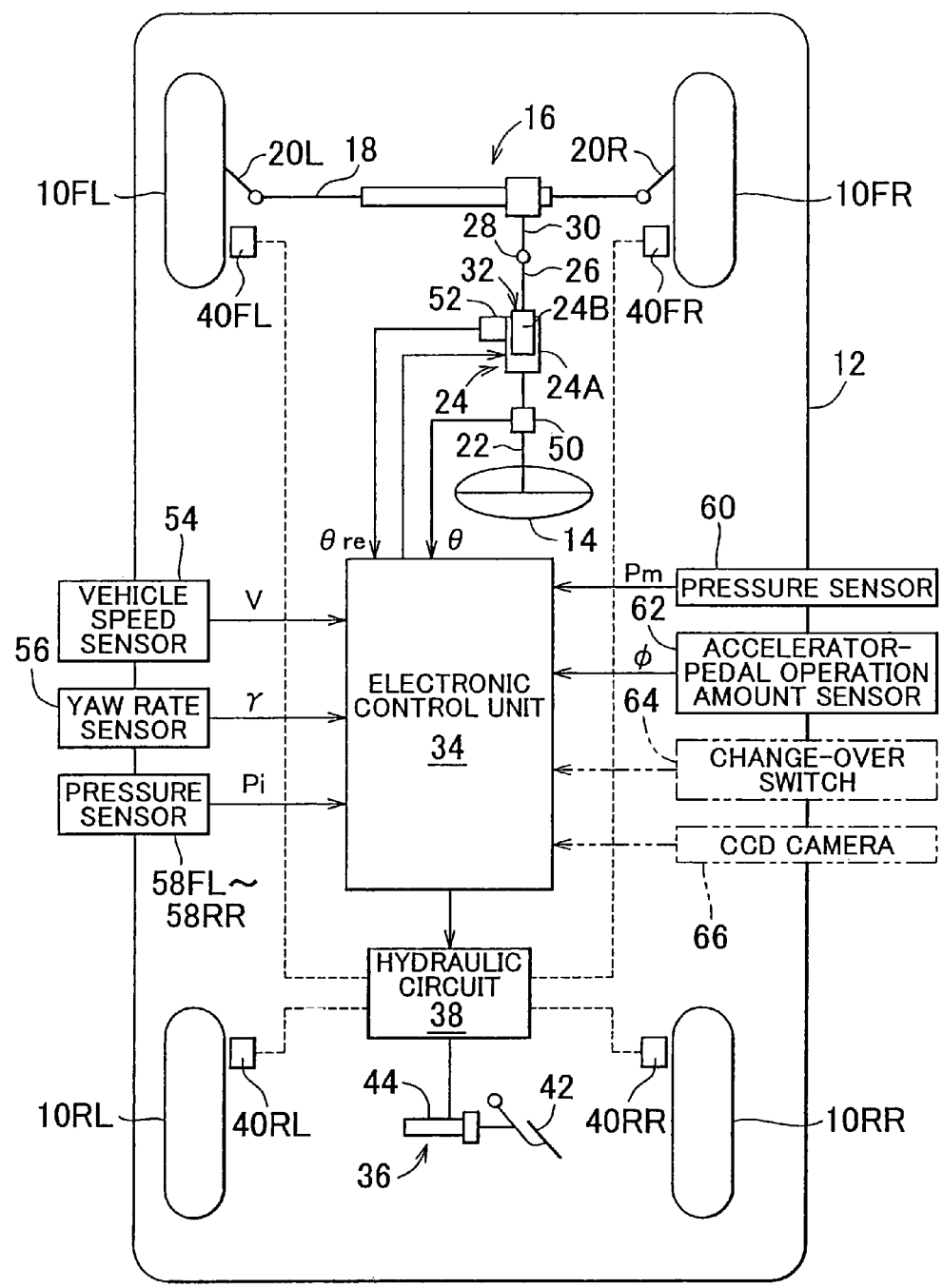
FIG. 1 is a schematic diagram showing the configuration of a running control apparatus for a vehicle according to a first embodiment of the invention, which is applied to a vehicle that includes a steering-angle changing device that functions as an automatic steering device.

FIG. 1 is a schematic diagram showing the configuration of a running control apparatus for a vehicle according to a first embodiment of the invention, which is applied to a vehicle that includes a steering-angle changing device that functions as an automatic steering device.

In FIG. 1, a vehicle 12 includes a front-left wheel 10FL, a front-right wheel 10FR, a rear-left wheel 10RL, and a rear-right wheel 10RR. The front-left and front-right wheels 10FL and 10FR are steering wheels, which are steered by a rack and pinion type power steering device 16 via a rack-bar 18 and tie-rods 20L and 20R. The power steering device 16 is driven in response to the movement of a driver's steering wheel 14 operated by a driver.

The driver's steering wheel 14 is connected to a pinion shaft 30 of the power steering device 16 via an upper steering shaft 22, a steering-angle changing device 24, a lower steering shaft 26, and a universal joint 28. The upper steering shaft 22 is considered as a first steering shaft. The lower steering shaft 26 is considered as a second steering shaft. In the illustrated embodiment, the steering-angle changing device 24 includes a motor 32 that assists the steering operation. The motor 32 is connected to the lower end of the upper steering shaft 22 on a housing 24A side, and to the upper end of the lower steering shaft 26 on a rotor 24B side.

The steering-angle changing device 24 functions as a steering-gear-ratio changing device. More specifically, the steering-angle changing device 24 rotates the lower steering shaft 26 with respect to the upper steering shaft 22, thereby changing the ratio of the steering angle of the steering wheels (front-left and front-right wheels 10FL and 10FR) to the rotational angle of the driver's steering wheel 14, that is, the steering gear ratio. The steering-angle changing device 24 also functions as an automatic steering device. More specifically, the steering-angle changing device 24 assists in steering the front-left and front-right wheels 10FL and 10FR with respect to the driver's steering wheel 14 to control the behavior of the vehicle. A steering control portion of an electronic control unit 34 controls the steering-angle changing device 24.

Ordinarily, the steering-angle changing device 24 rotates the lower steering shaft 26 with respect to the upper steering shaft 22 using the motor 32 so that the steering gear ratio becomes equal to a gear ratio at which a predetermined steering characteristic is obtained. When the steering-angle changing device 24 assists steering operation to control the behavior of the vehicle, the steering-angle changing device 24 actively rotates the lower steering shaft 26 with respect to the upper steering shaft 22 using the motor 32, thereby automatically steering the front-left and front-right wheels 10FL and 10FR as required.

If the steering-angle changing device 24 becomes unable to rotate the lower steering shaft 26 with respect to the upper steering shaft 22 due to malfunction, a lock device (not shown in FIG. 1) is activated. The lock device mechanically stops the relative rotation of the housing 24A and the rotor 24B to prevent a change in the rotational angle of the lower steering shaft 26 with respect to the upper steering shaft 22.

The power steering device 16 may be a hydraulic power steering device or an electric power steering device. However, preferably, the power steering device 16 is a rack drive electric power steering device that includes a motor and a screw-type conversion mechanism that converts rotation torque of the motor to force in the direction in which the rack-bar 18 reciprocates. Such a rack drive electric power steering device generates assist steering torque that reduces reaction torque that is generated when the steering-angle changing device 24 assists in steering the front wheels, and is transmitted to the driver's steering wheel 14.

The braking force for each wheel is controlled by controlling pressure Pi (i=fl, fr, rl, rr), that is, braking pressure in each of wheel cylinders 40FL, 40FR, 40RL, and 40RR, using a hydraulic circuit 38 in a braking device 36. The hydraulic circuit 38 includes an oil reservoir, an oil pump, and various valve devices (all of them are not shown). Ordinarily, the braking pressure in each wheel cylinder is controlled by a master cylinder 44. The master cylinder 44 is driven in accordance with the depression of a brake pedal 42 operated by a driver. The braking pressure in each wheel cylinder may be individually controlled by the electronic control unit 34 as required, as described in detail later.

In the illustrated embodiment, the upper steering shaft 22 is provided with a steering angle sensor 50 that detects the rotational angle of the upper steering shaft as the steering angle θ of the driver's steering wheel. The steering-angle changing device 24 is provided with a rotational angle sensor 52 that detects the relative rotational angle between the housing 24A and the rotor 24B as a relative rotational angle θre of the lower steering shaft 26 with respect to the upper steering shaft 22. Outputs from these sensors are supplied to the electronic control unit 34. The rotational angle sensor 52 may be replaced with a sensor that detects a rotational angle θs of the lower steering shaft 26. In this case, the relative rotational angle θre is obtained as a difference in the rotational angle (θs−θ).

The electronic control unit 34 receives a signal indicating the vehicle speed V detected by a vehicle speed sensor 54, a signal indicating the yaw rate γ of the vehicle detected by a yaw rate sensor 56, a signal indicating the braking pressure Pi for each wheel detected by each of pressure sensors 58FL to 58RR, a signal indicating the master cylinder pressure Pm detected by a pressure sensor 60, and the accelerator pedal operation amount φ detected by an accelerator-pedal operation amount sensor 62.

The electronic control unit 34 includes a steering control portion, a braking-force control portion, and a behavior control portion (all of these portions are not shown). The steering control portion controls the steering-angle changing device 24. The braking-force control portion controls the braking force for each wheel. The behavior control portion controls the behavior of the vehicle. Each control portion may include a microcomputer that has a CPU, ROM, RAM, and an input/output port device connected to each other by a bi-directional common bus. When the driver's steering wheel is steered so that the vehicle turns to the left, the value of the steering angle θ of the driver's steering wheel detected by the steering angle sensor 50 is a positive value. When the steering wheels are steered so that the vehicle turns to the left, the value of the relative rotational angle θre detected by the rotational angle sensor 52 is a positive value. When the vehicle turns to the left, the value of the yaw rate γ detected by the yaw rate sensor 56 is a positive value.

As described later, the electronic control unit 34 calculates an actual steering angle δa of the front-left and front-right wheels based on the steering angle θ of the driver's steering wheel, which shows the amount of steering operation performed by the driver, the relative rotational angle θre, and a steering gear ratio Rg. The steering angle θ of the driver's steering wheel shows the amount of steering operation performed by the driver. The electronic control unit 34 calculates a target yaw rate γt of the vehicle based on the actual steering angle δa and the vehicle speed V. Then, the electronic control unit 34 calculates a yaw rate deviation Δγ of an actual yaw rate γ from the target yaw rate γt detected by the yaw rate sensor 56. Then, on the basis of the yaw rate deviation Δγ, the electronic control unit 34 calculates a target yaw moment Mt to stabilize the movement of the vehicle by reducing the yaw rate deviation Δγ. The electronic control unit 34 calculates the target yaw moment Mt as a target turning control amount of the vehicle.

The electronic control unit 34 calculates a change rate φd of an accelerator pedal operation amount φ as the amount of change in the accelerator pedal operation amount φ per unit time (i.e., time-derivative value). The electronic control unit 34 increases or decreases the target yaw moment Mt in accordance with the change rate φd of an accelerator pedal operation amount φ. The electronic control unit 34 also calculates a proportion ωs used to allocate the target yaw moment Mt to the steering angle control, and a proportion ωb used to allocate the target yaw moment Mt to the braking force control. On the basis of the proportions ωs and ωb, the target yaw moment Mt is divided into a target yaw moment Mts for the steering angle control, and a target yaw moment Mtb for the braking force control.

Further, the electronic control unit 34 calculates a target steered angle Δδt of the front-left and front-right wheels to achieve the target yaw moment Mts. The electronic control unit 34 controls the steering-angle changing device 24 so that the steering angle of the front-left and front-right wheels 10FL and 10FR becomes equal to a target steering angle δt that is obtained by summing the actual steering angle δa and the target steered angle Δδt. Also, the electronic control unit 34 calculates a target braking pressure Pti for each wheel to achieve the target yaw moment Mtb. Then, the electronic control unit 34 controls the braking pressure Pi for each wheel so that the braking pressure Pi becomes equal to the corresponding target braking pressure Pti, thereby reducing the yaw rate deviation Δδ to stabilize the running movement of the vehicle.

Figure 2:
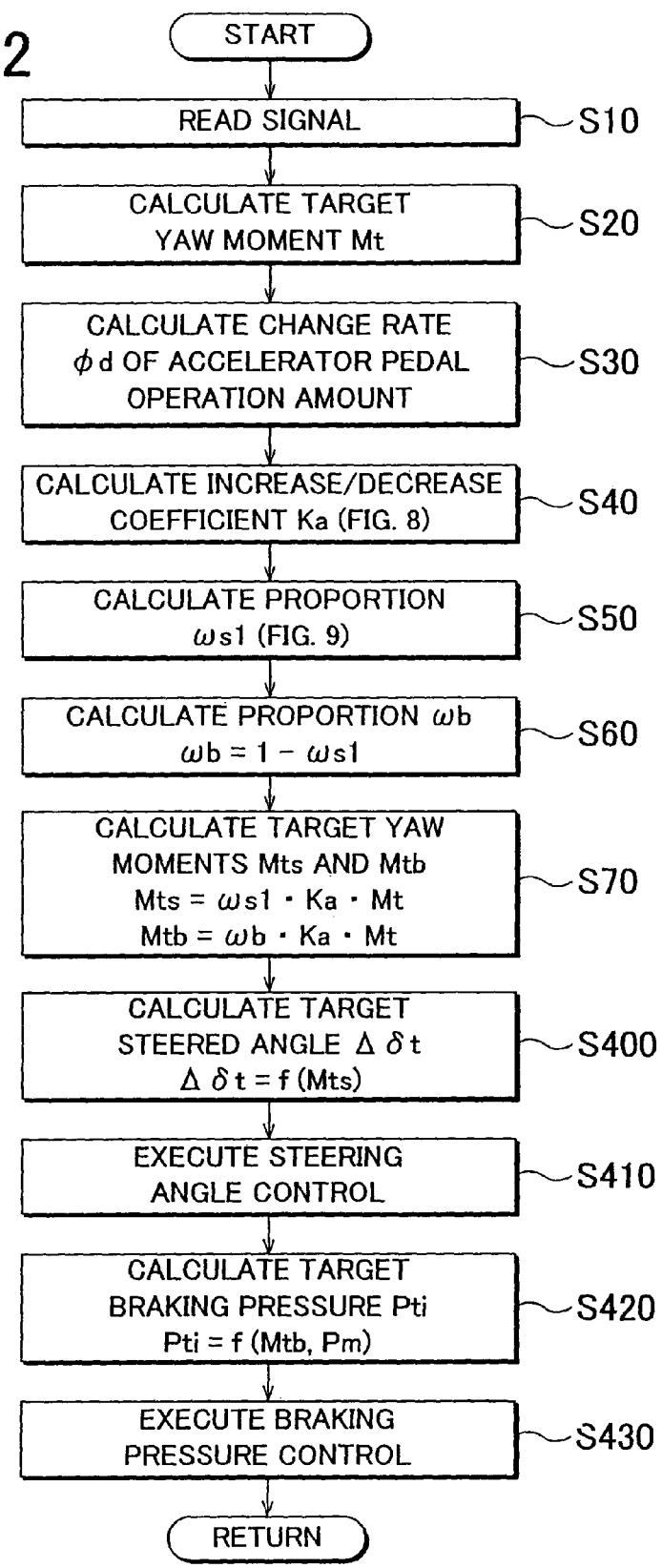
FIG. 2 is a flowchart showing a running control routine according to the first embodiment of the invention.

Next, a running control routine for a vehicle executed by the electronic control unit 34 according to the illustrated embodiment will be described with reference to the flowchart shown in FIG. 2. In the control routine, the running movement of the vehicle is controlled by controlling the steering angle of the front-left and front-right wheels. The control routine shown in the flowchart in FIG. 2 is started by closing an ignition switch (not shown) and executed at predetermined time intervals.

First, in step S10, a signal indicating the steering angle θ of the driver's steering wheel and the like are read. In step S20, on the basis of the steering angle θ and the steering gear ratio Rg, an estimated steering angle δf (=θ/Rg) of the front-left and front-right wheels. Also, a reference yaw rate γe is calculated based on the vehicle speed V and the estimated steering angle δf, according to the following equation 1.

$$\gamma e = V \times \delta f / (1 + Kh V^2) H \tag{1}$$

In the equation (1), "H" represents a wheel base, and "Kh" represents a stability factor. Also, the target yaw rate γt of the vehicle is calculated according to the following equation 2.

$$\gamma t = \gamma e / (1 + Ts) \tag{2}$$

In the equation (2), "T" represents a time constant, and "s" represents a Laplace operator. To calculate dynamic yaw rate, the reference yaw rate γe may be calculated taking into account lateral acceleration Gy of the vehicle.

In step S20, the yaw rate deviation Δγ, which is the deviation of the actual yaw rate γ from the target yaw rate γt of the vehicle, is calculated. On the basis of the yaw rate deviation Δγ, the target yaw moment Mt is calculated as the target turning control amount used to reduce the yaw rate deviation Δγ, using a known method.

Figure 8:
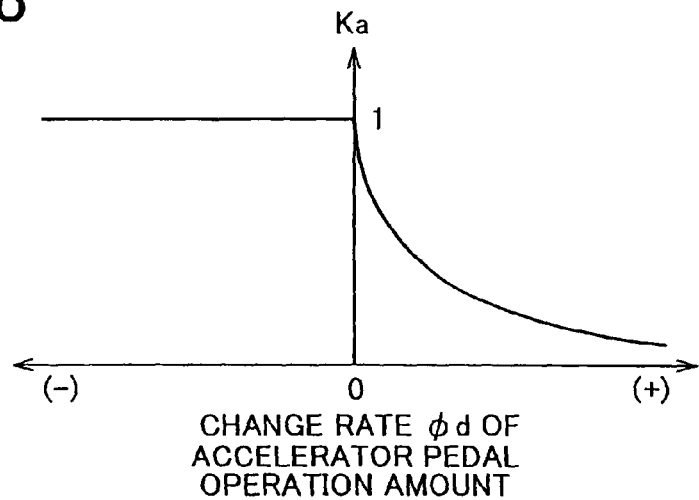
FIG. 8 is a graph showing the relation between a change rate φd of an accelerator pedal operation amount φ and an increase/decrease coefficient Ka of a target yaw moment.

In step S30, the change rate φd of the accelerator pedal operation amount φ is calculated as the amount of change in the accelerator pedal operation amount φ per unit time. In step S40, on the basis of the change rate φd of the accelerator pedal operation amount φ, an increase/decrease coefficient Ka of the target yaw moment is calculated using a map corresponding to a graph shown in FIG. 8. As shown in FIG. 8, the increase/decrease coefficient Ka is 1 when the change rate φd of the accelerator pedal operation amount φ is a negative value. The increase/decrease coefficient Ka gradually decreases as the change rate φd increases when the change rate φd is a positive value.

Figure 9:
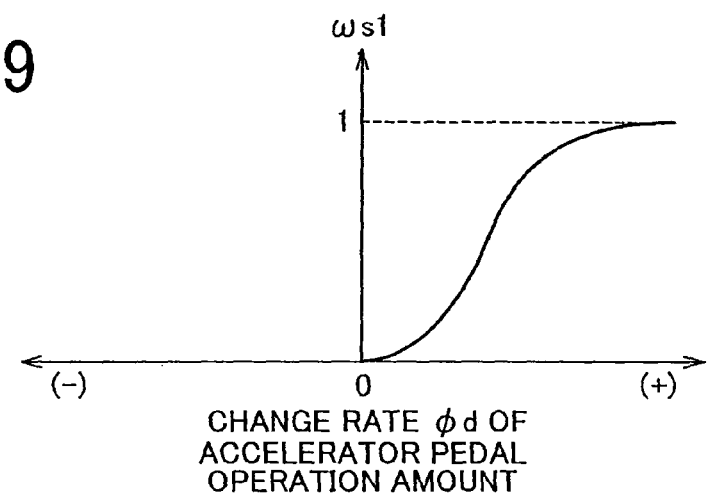
FIG. 9 is a graph showing the relation between the change rate φd of the accelerator pedal operation amount φ and a proportion ωs1 for a steering angle control.

In step S50, on the basis of the change rate φd of the accelerator pedal operation amount φ, a proportion ωs1 used to allocate the target yaw moment to the steering angle control is calculated. In step S60, the proportion ωb used to allocate the target yaw moment to the braking force control is calculated by subtracting the proportion ωs1 from 1 (1−ωs1). As shown in FIG. 9, the proportion ωs1 is 0 when the change rate φd of the accelerator pedal operation amount φ is a negative value. The proportion ωs1 gradually increases as the change rate φd of the accelerator pedal operation amount φ increases when the change rate φd is a positive value.

In step S70, on the basis of the increase/decrease coefficient Ka, the proportion ωs1 for the steering angle control, and the proportion ωb for the braking force control, the value of the target yaw moment Mt allocated to the steering angle control (target yaw moment Mts for the steering angle control) and the value of the target yaw moment Mt allocated to the braking force control (target yaw moment Mtb for the braking force control) are calculated according to the following equations 3 and 4, respectively.

$$Mts = \omega s1 \times Ka \times Mt \tag{3}$$

$$Mtb = \omega b \times Ka \times Mt \tag{4}$$

In step S400, the target steered angle Δδt of the front wheels is calculated as the function of the target yaw moment Mts for the steering angle control. In step S410, the steering-angle changing device 24 is controlled so that the front-left and front-right wheels are steered by the target steered angle Δδt.

In step S420, on the basis of the target yaw moment Mtb for the braking force control and the master cylinder pressure Pm, the target braking pressure Pti (i=fl, fr, rl, rr) for each wheel is calculated, as the sum of the target braking pressure for each wheel based on the master cylinder pressure Pm and an increase/decrease amount of the braking pressure for each wheel. The increase/decrease amount of the braking pressure is the amount by which the braking pressure needs to be increased or decreased to achieve the target yaw moment Mtb for the braking force control. In step S430, the braking device 36 is controlled so that the braking pressure Pi for each wheel becomes equal to the corresponding target braking pressure Pti.

In the illustrated first embodiment, the target yaw moment Mt of the vehicle, which is used to stabilize the running movement of the vehicle, is calculated in step S20. In step S30, the change rate φd of the accelerator pedal operation amount φ is calculated as the rate of change in the amount of acceleration operation performed by the driver. In step S50, the proportion ωs1 for the steering angle control is calculated. When the change rate φd is a positive value, the proportion ωs1 gradually increases as the change rate φd of the accelerator pedal operation amount φ increases. In step S60, the proportion ωb used to allocate the target yaw moment to the braking force control is calculated by subtracting the proportion ωs1 from 1 (1−ωs1). In step S70, on the basis of the proportion ωs1 for the steering angle control, and the proportion ωb for the braking pressure control, the target yaw moment Mts and the target yaw moment Mtb are calculated. The target yaw moment Mts is the value of the target yaw moment Mt allocated to the steering angle control. The target yaw moment Mtb is the value of the target yaw moment Mt allocated to the braking force control. In steps S400 to 430, the steering-angle changing device 24 and the braking device 36 are controlled so that the yaw moment obtained by the steering angle control becomes equal to the target yaw moment Mts and the yaw moment obtained by the braking force control becomes equal to the target yaw moment Mtb.

Accordingly, the target yaw moment Mt is appropriately divided to the target yaw moment Mts for the steering angle control and the target yaw moment Mtb for the braking force control, based on the rate of increase in the amount of acceleration operation performed by the driver. Therefore, when the driver intends to accelerate the vehicle to a greater extent, the yaw moment obtained by the steering angle control is increased. As a result, the vehicle can stably run while preventing deterioration of the acceleration performance of the vehicle due to the braking force control. When the driver intends to accelerate the vehicle to a smaller extent, the yaw moment obtained by the braking force control is increased. As a result, the vehicle can be effectively stabilized in quick response to the driver's driving operation. Thus, the target yaw moment can be divided based on the running mode desired by the occupant, and the intention of the driver.

Particularly in the illustrated first embodiment, in step S40, on the basis of the change rate φd of the accelerator pedal operation amount φ, the increase/decrease coefficient Ka of the target yaw moment is calculated. The increase/decrease coefficient Ka gradually decreases as the change rate φd of the accelerator pedal operation amount φ increases when the change rate φd of the accelerator pedal operation amount φ is a positive value. Therefore, as the driver intends to accelerate the vehicle to a greater extent, the target yaw moment that needs to be applied to the vehicle is decreased. As a result, when the driver intends to accelerate the vehicle to a great extent, the vehicle runs based on the running mode desired by the driver and the intention of the driver. When the driver intends to accelerate the vehicle to a small extent, the running movement of the vehicle can be effectively stabilized.

Also, in the illustrated first embodiment, when the change rate φd of the accelerator pedal operation amount φ is not a positive value, the proportion ωs1 for the steering angle control is set to 0. Therefore, all of the target yaw moment Mt is allocated to the braking force control. Accordingly, as compared to the case where the proportion ωs1 for the steering angle control is set to a value greater than 0 and less than 1 even when the change rate φd of the accelerator pedal operation amount φ is not a positive value, the running movement of the vehicle can be effectively stabilized in quick response to the driver's driving operation, using the yaw moment obtained by the braking force control.

Second Embodiment

Figure 3:
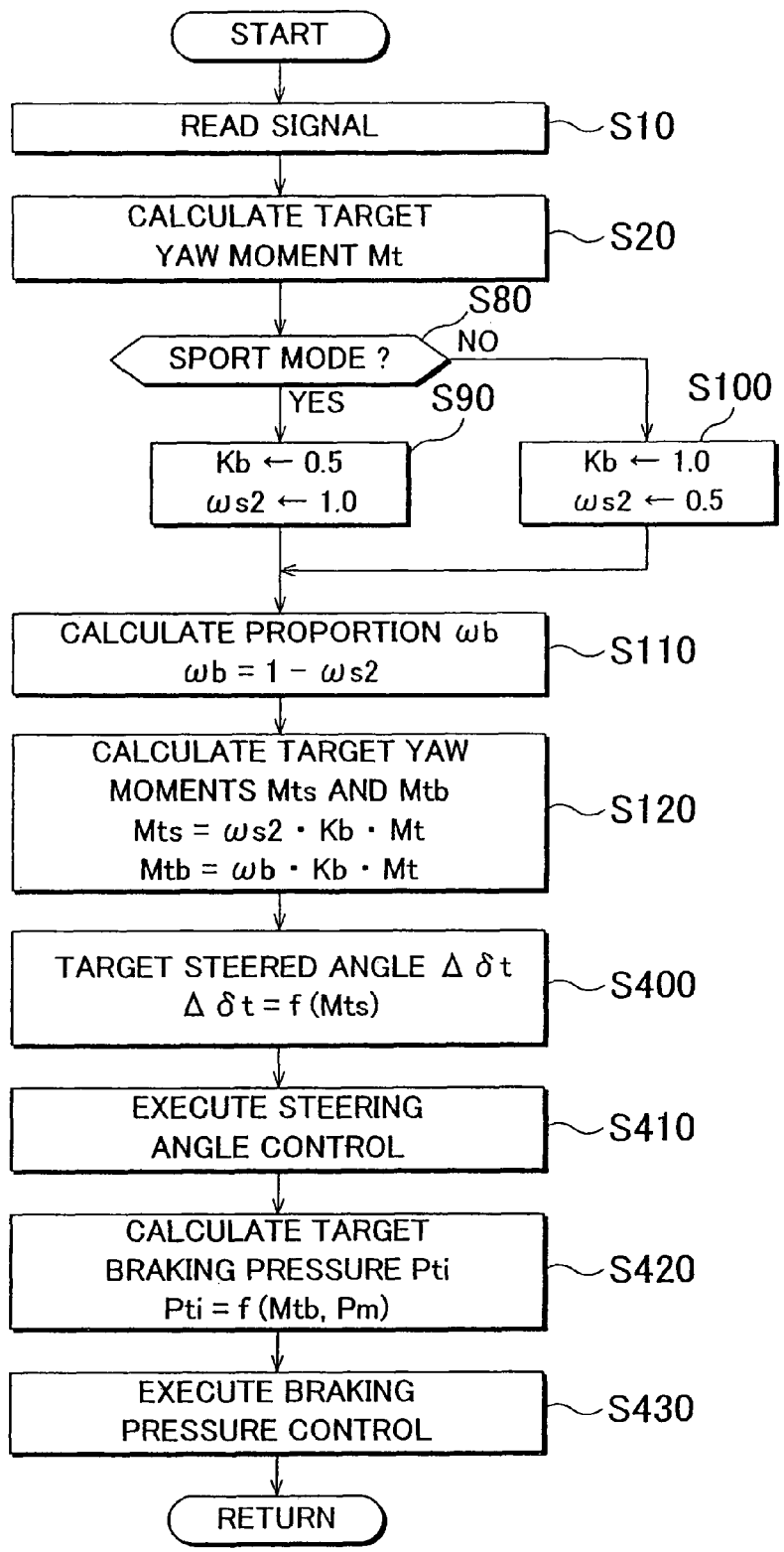
FIG. 3 is a flowchart showing a running control routine according to a second embodiment of the invention.

FIG. 3 is a flowchart showing a running control routine executed by a running control apparatus for a vehicle according to a second embodiment of the invention. In FIG. 3, the same steps as those in FIG. 2 are denoted by the same step numbers. Similarly, the same steps as those in FIG. 2 are denoted by the same step numbers also in FIG. 4 to FIG. 7.

In the second embodiment, the electronic control unit 34 does not receive the signal indicating the accelerator pedal operation amount φ from the accelerator-pedal operation amount sensor 62. However, as shown by a two-dot chain line in FIG. 1, the electronic control unit 34 receives a signal indicating the driving mode. The driving mode of the vehicle is set to a sport mode or a standard mode by a change-over switch 64 operated by the driver. When the driving mode of the vehicle is set to the sport mode, the vehicle moves in quick response to the driver's driving operation, as compared to when the driving mode is set to the standard mode.

On the basis of the driving mode of the vehicle and the change rate φd of the accelerator pedal operation amount φ, the electronic control unit 34 calculates a proportion ωs2 used to allocate the target yaw moment Mt to the steering angle control and the proportion ωb used to allocate the target yaw moment Mt to the braking force control. On the basis of the proportions ω2 and ωb, the target yaw moment Mt is divided to the target yaw moment Mts for the steering angle control and the target yaw moment Mtb for the braking force control.

As shown in FIG. 3, in the second embodiment, steps S10 and S20, and steps S400 to S430 are executed in the same manner as in the first embodiment. After step S20 is finished, the routine proceeds to step S80.

In step S80, it is determined whether the driving mode of the vehicle set by the change-over switch 64 is sport mode. When an affirmative determination is made in step S80, an increase/decrease coefficient Kb of the target yaw moment is set to 0.5, and the proportion ωs2 for the steering angle control is set to 1.0 in step S90. Then, the routine proceeds to step S110. When a negative determination is made in step S80, the increase/decrease coefficient Kb of the target yaw moment is set to 1.0, and the proportion ωs2 for the steering angle control is set to 0.5 in step S100. Then, the routine proceeds to step S110.

In step S110, the proportion ωb for the braking force control is calculated by subtracting the proportion ωs2 from 1 (1−ωs2). In step S120, on the basis of the increase/decrease coefficient Kb, the proportion ωs2 for the steering angle control, and the proportion ωb for the braking force control, the value of the target yaw moment Mt allocated to the steering angle control (the target yaw moment Mts for the steering angle control) and the value of the target yaw moment Mt allocated to the braking force control (the target yaw moment Mtb for the braking force control) are calculated according to the following equations (5) and (6), respectively.

$$Mts = \omega s2 \times Kb \times Mt \quad (5)$$

$$Mtb = \omega b \times Kb \times Mt \quad (6)$$

Thus, in the illustrated second embodiment, in steps S80 to S110, on the basis of the driving mode of the vehicle set by the change-over switch 64 and the change rate φd of the accelerator pedal operation amount φ, the increase/decrease coefficient Kb, the proportion ωs2 for the steering angle control, and the proportion ωb for the braking force control are calculated. On the basis of the increase/decrease coefficient Kb, the yaw moment that needs to be applied to the vehicle is increased or decreased. Also, on the basis of the proportions ωs2 and ωb, the target yaw moment Mt is divided into the target yaw moment Mts for the steering angle control and the target yaw moment Mtb for the braking force control.

Accordingly, the proportion ωs2 for the steering angle control in the sport mode is greater than that in the standard mode. Therefore, the yaw moment applied to the vehicle, and the allocation of the target yaw moment Mt to the steering angle control and to the braking force control are controlled based on whether the driver wants the vehicle to move in quick response to the driver's driving operation. Thus, the allocation of the target yaw moment to the steering angle control and to the braking force control can be appropriately controlled according to the driving mode desired by the occupant and the intention of the driver.

Particularly in the illustrated second embodiment, in the sport mode, the increase/decrease coefficient Kb is set to a smaller value than that in the standard mode. Therefore, the yaw moment applied to the vehicle can be controlled based on whether the driver wants the vehicle to move in quick response to the driver's driving operation. Thus, as compared to the case where only the proportions used to allocate the target yaw moment Mt are variably set according to the selected driving mode of the vehicle, the yaw moment applied to the vehicle can be controlled more appropriately and more accurately according to the driving mode desired by the occupant and the intention of the driver.

In the illustrated second embodiment, the proportion ωs2 for the steering angle control in the sport mode is greater than that in the standard mode, and the increase/decrease coefficient Kb in the sport mode is smaller than that in the standard mode. Therefore, as compared to the case where the proportion ωs2 for the steering angle control in the standard mode is smaller than that in the standard mode and the increase/decrease coefficient Kb in the sport mode is greater than that in the sport mode, the yaw moment applied to the vehicle can be controlled appropriately and more accurately according to the driving mode desired by the occupant and the intention of the driver.

Third Embodiment

Figure 4:
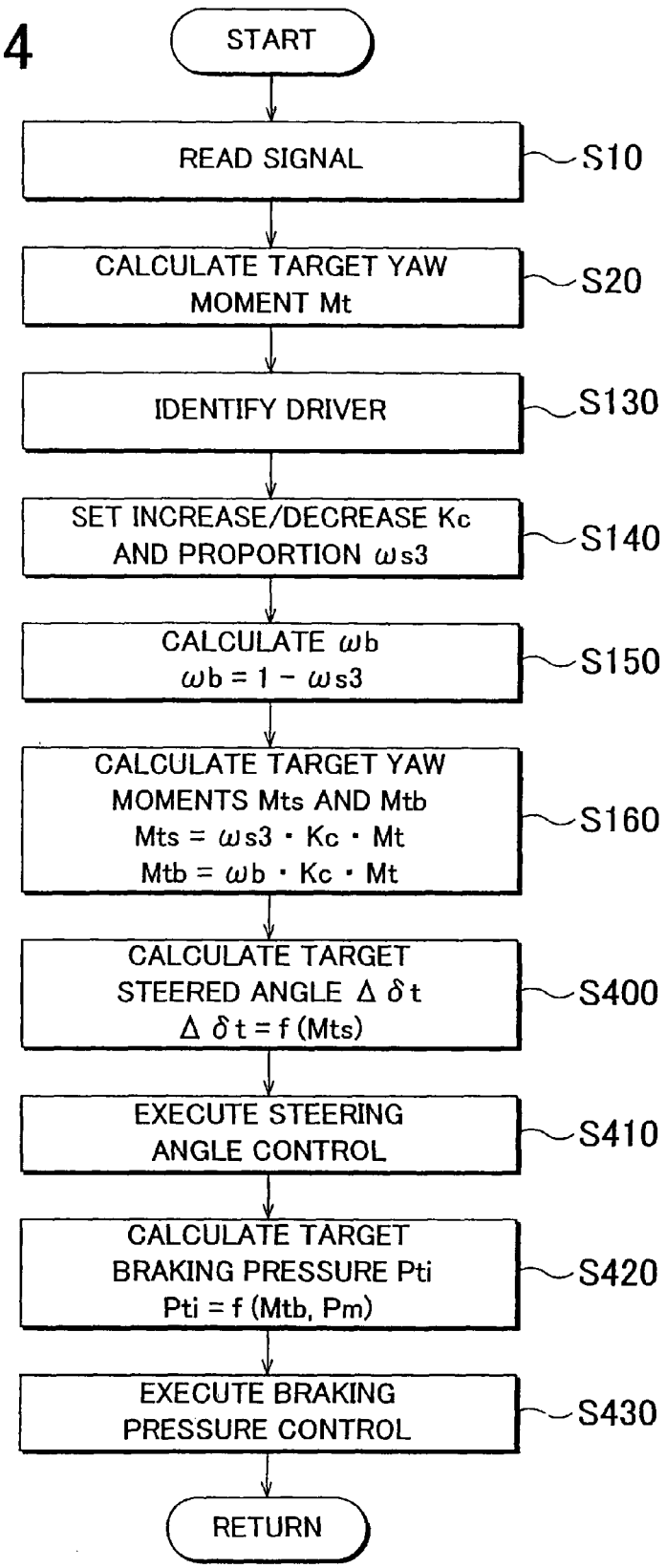
FIG. 4 is a flowchart showing a running control routine according to a third embodiment of the invention.

FIG. 4 is a flowchart showing a running control routine executed by a running control apparatus for a vehicle according to a third embodiment of the invention.

In the third embodiment, when the driver operates a driver identification button (not shown in FIG. 1), the driver is identified. Drivers, values of an increase/decrease coefficient Kc, and values of a proportion ωs3 used to allocate the target yaw moment to the steering angle control are registered in the electronic control unit 34, for example, as shown in Table 1. The value of the increase/decrease coefficient Kc and the value of the proportion ωs3 indicate the driving mode desired by the driver. The registered drivers correspond to the respective driver identification buttons.

TABLE 1

|  | Increase/decrease coefficient Kc | Proportion ωs3 |
| --- | --- | --- |
| Driver A | 1.0 | 0.2 |
| Driver B | 0.8 | 0.5 |
| Driver C | 0.2 | 1.0 |

After the driver is identified by operation of the driver identification button, the electronic control unit 34 sets the increase/decrease coefficient Kc used to increase or decrease the target yaw moment Mt, and the proportion ωs3 for the steering angle control, based on the registered information on the identified driver.

As shown in FIG. 4, in the third embodiment, steps S10 and S20, and steps S400 to S430 are executed in the same manner as in the first embodiment. After step S20 is finished, the routine proceeds to step S130.

In step S130, the driver is identified based on the operation of the driver identification button. In step S140, the increase/decrease coefficient Kc and the proportion ωs3 for the steering angle control are set to the values corresponding to the identified driver. In step S150, the proportion ωb for the braking force control is calculated by subtracting the proportion ωs3 from 1 (1−ωs3).

In step S160, on the basis of the increase/decrease coefficient Kc, the proportion ωs3 for the steering angle control, and the proportion ωb for the braking force control, the value of the target yaw moment Mt allocated to the steering angle control (target yaw moment Mts for the steering angle control) and the value of the target yaw moment Mt allocated to the braking force control (target yaw moment Mtb for the braking force control) are calculated according to the following equations 7 and 8, respectively.

$$Mts = \omega s3 \times Kc \times Mt \quad (7)$$

$$Mtb = \omega b \times Kc \times Mt \quad (8)$$

In the illustrated third embodiment, in step S130, the driver is identified based on the operation of the driver identification button. In step S140, the increase/decrease coefficient Kc and the proportion ωs3 for the steering angle control are set to the values corresponding to the identified driver. In step S150, the proportion ωb for the braking force control is calculated by subtracting the proportion ωs3 from 1 (1−ωs3). In step S160, on the basis of the increase/decrease coefficient Kc, the proportion ωs3 for the steering angle control, and the proportion ωb for the braking force control, the value of the target yaw moment Mt allocated to the steering angle control (target yaw moment Mts for the steering angle control) and the value of the target yaw moment Mt allocated to the braking force control (target yaw moment Mtb for the braking force control) are calculated.

Accordingly, the increase/decrease coefficient Kc, the proportion ωs3 for the steering angle control, and the proportion ωb for the braking force control are accurately set to the optimal values. As a result, the yaw moment applied to the vehicle, and the proportions used to allocate the target yaw moment Mt to the steering angle control and to the braking force control can be controlled to the optimal values for each driver. Thus, the yaw moment applied to the vehicle and the allocation of the yaw moment can be appropriately controlled according to the driving mode desired by the driver and the intention of the driver.

Particularly in the illustrated third embodiment, because the increase/decrease coefficient Kc is also variably set according to the driver, the yaw moment applied to the vehicle can be controlled according to the driver. As compared to the case where only the proportions used to allocate the target yaw moment Mt to the steering angle control and to the braking force control are variably set according to the driver, the yaw moment applied to the vehicle and the allocation of the target yaw moment can be controlled more accurately according to the mode desired by the occupant and the intention of the driver.

In the illustrated third embodiment, the proportion ωs3 and the increase/decrease coefficient Kc are set based on the information that is registered in advance. Therefore, the proportion ωs3 and the increase/decrease coefficient Kc can be set according to the identified driver, without requiring complicated calculation and the like.

In the illustrated third embodiment, when the driver operates the driver identification button, the driver is identified. However, the driver may be identified using any means for identifying a person that is known in the technical field. Examples of means for identifying a person are described in Japanese Patent Application Publications No. JP-A-2-173868, JP-A-2-173869, JP-A-3-87981, JP-A-9-147113, JP-A-2001-167274, and JP-A-2002-259982.

Fourth Embodiment

Figure 5A:
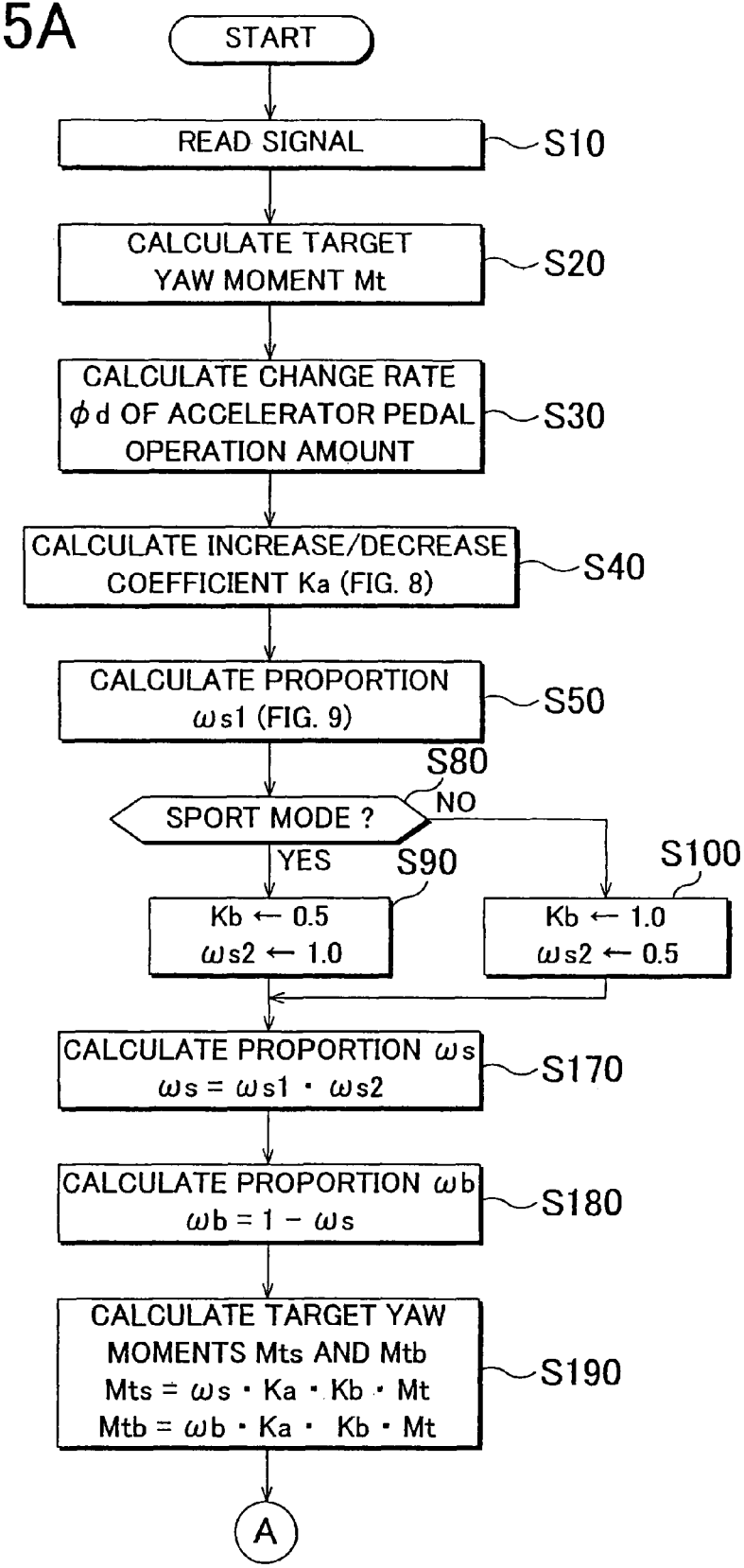
FIGS. 5A and 5B are a flowchart showing a running control routine according to a fourth embodiment of the invention.
Figure 5B:
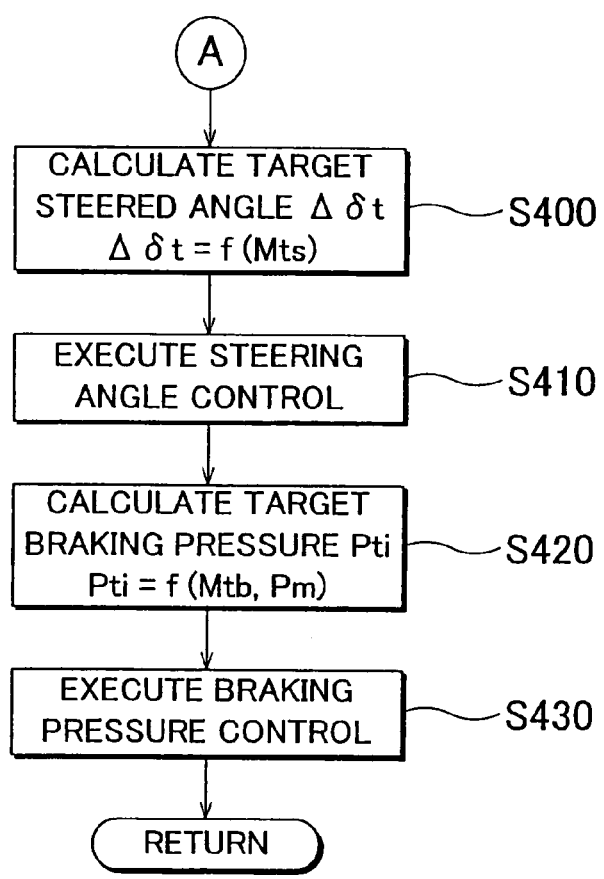

FIGS. 5A and 5B are a flowchart showing a running control routine executed by a running control apparatus for a vehicle according to a fourth embodiment of the invention. The fourth embodiment is made by modifying the first embodiment and the second embodiment.

As shown in FIGS. 5A and 5B, in the fourth embodiment, steps S10 to S50, steps S80 to S100, and steps S400 to S430 are executed in the same manner as in the first embodiment and the second embodiment. After step S90 or S100 is finished, the routine proceeds to step S170.

In step S170, a proportions ωs used to allocate the target yaw moment to the steering angle control is calculated as the product of the proportions ωs1 and ωs2. In step S180, the proportion ωb used to allocate the target yaw moment to the braking force control is calculated by subtracting the proportion ωs from 1 (1−ωs).

In step S190, on the basis of the increase/decrease coefficients Ka and Kb, the proportion ωs for the steering angle control, and the proportion ωb for the braking force control, the value of the target yaw moment Mt allocated to the steering angle control (the target yaw moment Mts for the steering angle control) and the value of the target yaw moment Mt allocated to the braking force control (the target yaw moment Mtb for the braking force control) are calculated, according to the following equations (9) and (10), respectively.

$$Mts = \omega s \times Ka \times Kb \times Mt \quad (9)$$

$$Mtb = \omega b \times Ka \times Kb \times Mt \quad (10)$$

In the illustrated fourth embodiment, in step S40, on the basis of the change rate φd of the accelerator pedal operation amount φ, the increase/decrease coefficient Ka of the target yaw moment is calculated. When the change rate change rate φd of the accelerator pedal operation amount φ is a positive value, the increase/decrease coefficient Ka gradually decreases as the change rate φd increases. In step S50, on the basis of the change rate φd of the accelerator pedal operation amount φ, the proportion ωs1 for the steering angle control is calculated. When the change rate φd is a positive value, the proportion ωs1 gradually increases as the change rate φd increases. In steps 80 to 100, it is determined whether the driving mode set by the change-over switch 64 is the sport mode or the standard mode. Also, on the bases of the change rate φd of the accelerator pedal operation amount φ, the increase/decrease coefficient Kb and the proportion ωs2 for the steering angle control are calculated.

In step S170, the proportion ωs for the steering angle control is calculated as the product of the proportions ωs1 and ωs2. In step S180, the proportion ωb for the braking force control is calculated by subtracting the proportion ωs from 1 (1−ωs). On the bases of the increase/decrease coefficients Ka and Kb, the yaw moment that needs to be applied to the vehicle is increased or decreased. Also, on the basis of the proportions ωs and ωb, the target yaw moment Mt is divided to the target yaw moment Mts for the steering angle control and the target yaw moment Mtb for the braking force control.

Accordingly, the effects of both of the first embodiment and the second embodiment are obtained. The target yaw moment and the allocation of the target yaw moment can be controlled more appropriately according to the driving mode desired by the occupant, and the intention of the driver than in the first and second embodiments.

Fifth Embodiment

Figure 6A:
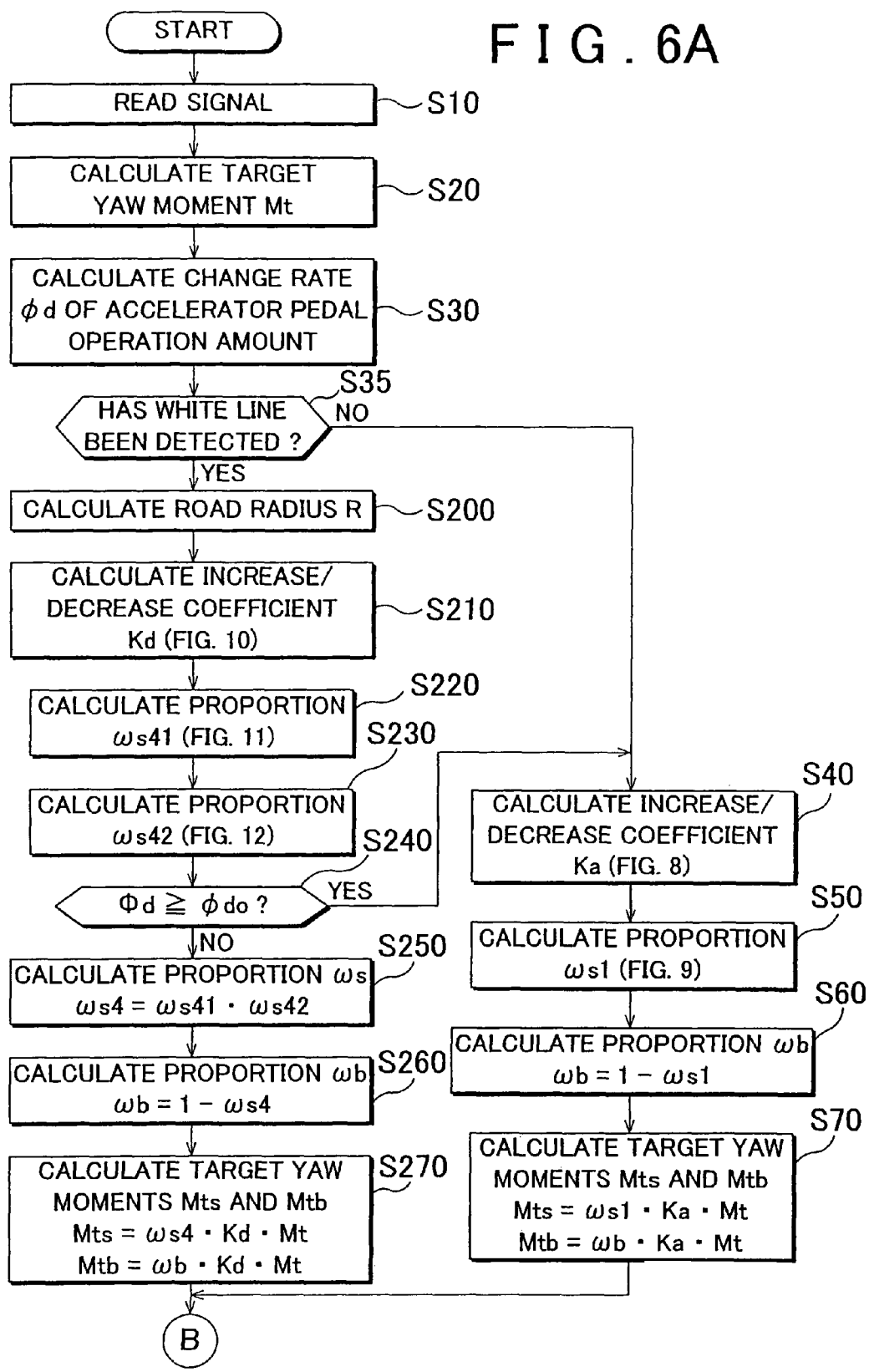

FIGS. 6A and 6B are a flowchart showing a running control routine executed by a running control apparatus for a vehicle according to a fifth embodiment of the invention.

In the fifth embodiment, as shown by a two-dot chain line in FIG. 1, the vehicle 12 is provided with a CCD camera 66. The electronic control unit 34 receives a signal indicating image information on the scene in front of the vehicle, which is captured by the CCD camera 66.

The electronic control unit 34 analyzes the image information on the scene in front of the vehicle using a method known in the technical field, thereby calculating a road radius R, as the degree of curve of the road on which the vehicle 12 is running. On the basis of the road radius R, the electronic control unit 34 calculates an increase/decrease coefficient Kd used to increase or decrease the target yaw moment Mt. Also, the electronic control unit 34 calculates a proportion ωs41 used to allocate the target yaw moment Mt to the steering angle control. Also, based on whether the target yaw moment Mt is a positive value or a negative value, and the target yaw moment Mt, the electronic control unit 34 calculates a proportion ωs42 used to allocate the target yaw moment Mt to the steering angle control. On the basis of the proportions ωs41 and ωs42, the electronic control unit 34 calculates a proportion ωs4 used to allocate the target yaw moment Mt to the steering angle control, and the proportion ωb used to allocate the target yaw moment Mt to the braking force control.

In the fifth embodiment, as shown in FIGS. 6A and 6B, steps 10 to 30, steps 40 to 70, and steps 400 to 430 are executed in the same manner as in the first and second embodiments. After step 30 is finished, the routine proceeds to step S35.

In step S35, it is determined whether a white line on the road on which the vehicle 12 is running has been detected, by performing image analysis processing known in the technical field on the image of the scene in front of the vehicle, which is captured by the CCD camera 66. When a negative determination is made, steps 40 to 70 are executed, and then the routine proceeds to step S400. When an affirmative determination is made, the routine proceeds to step S200.

In step S200, on the basis of the information on the road that is obtained by the image analysis processing, the configuration of the road is estimated. Also, on the basis of the estimated configuration of the road, the road radius R is calculated as the degree of curve of the road.

Figure 10:
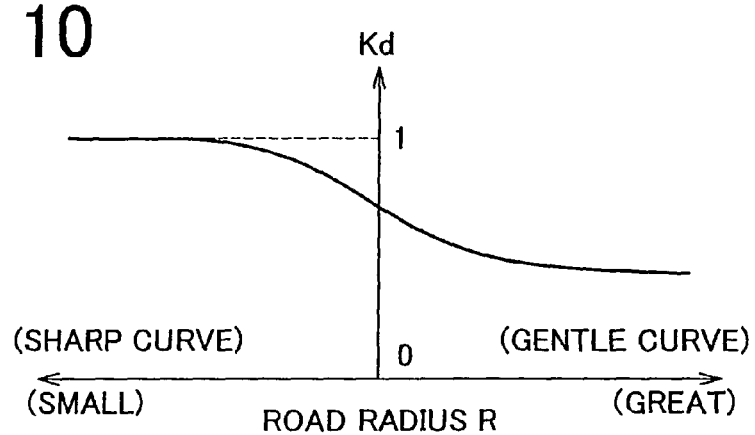
FIG. 10 is a graph showing the relation between a road radius R and an increase/decrease coefficient Kd of the target yaw moment.
Figure 11:
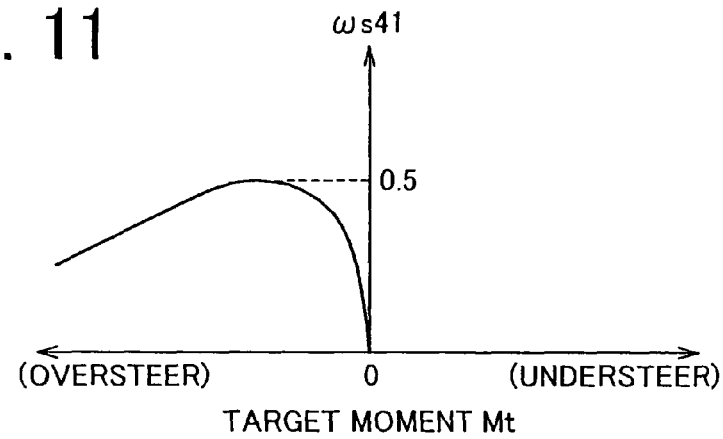
FIG. 11 is a graph showing the relation between a target yaw moment Mt and a proportion ωs41 for the steering angle control.
Figure 12:
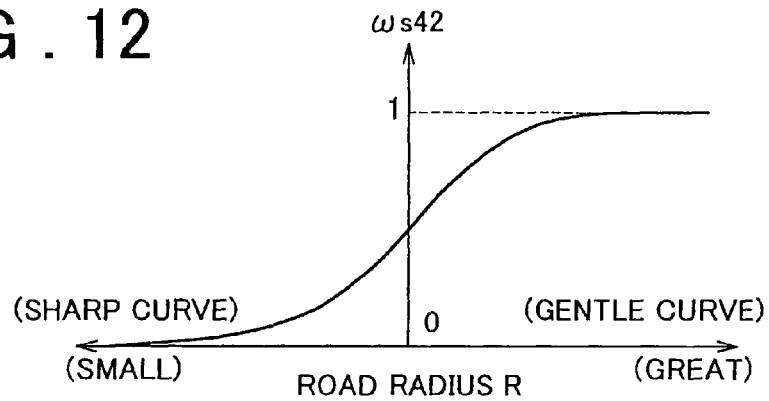
FIG. 12 is a graph showing the relation between the road radius R and a proportion ωs42 for the steering angle control.

In step S210, on the basis of the road radius R, the increase/decrease coefficient Kd of the target yaw moment is calculated using a map corresponding to the graph in FIG. 10. In step S220, on the basis of the target yaw moment Mt, the proportion ωs41 for the steering angle control is calculated. In step S230, on the basis of the road radius R, the proportion ωs42 for the steering angle control is calculated using the map corresponding to the graph in FIG. 12.

In step S240, it is determined whether the change rate φd of the accelerator pedal operation amount φ is greater than or equal to a reference value φdo (a positive constant value). When an affirmative determination is made, the routine proceeds to step S40. When a negative determination is made, the routine proceeds to step S250.

In step S250, the proportion ωs4 for the steering angle control is calculated as the product of the proportions ωs41 and ωs42. In step S260, the proportion ωb for the braking force control is calculated by subtracting the proportion ωs4 from 1 (1−ωs4).

In step S270, on the basis of the increase/decrease coefficient Kd, the proportion ωs4 for the steering angle control, and the proportion ωb for the braking force control, the value of the target yaw moment Mt allocated to the steering angle control (target yaw moment Mts for the steering angle control) and the value of the target yaw moment Mt allocated to the braking force control (target yaw moment Mtb for the braking force control) are calculated, according to the following equations 11 and 12, respectively.

$$Mts = \omega s4 \times Kd \times Mt \quad (11)$$

$$Mtb = \omega b \times Kd \times Mt \quad (12)$$

Thus, in the illustrated fifth embodiment, in steps 35 and 200, the road radius R is calculated as the degree of curve of the road. In step S210, the increase/decrease coefficient Kd of the target yaw moment is calculated based on the road radius R. As the curve of the road becomes sharper, the increase/decrease coefficient Kd increases. In step S220, on the basis of the target yaw moment Mt, the proportion ω41 for the steering angle control is calculated. In step S230, on the basis of the road radius R, the proportion ωs42 for the steering angle control is calculated. As the curve of the road becomes sharper, the proportion ωs42 decreases.

When it is determined that the change rate φd of the accelerator pedal operation amount φ is less than the reference value φdo in step S240, the proportion ωs4 for the steering angle control is calculated as the product of the proportions ωs41 and ωs42 in step S250. In step S260, the proportion ωb for the braking force control is calculated by subtracting the proportion ωs4 from 1 (1−ωs4). In step S270, on the basis of the increase/decrease coefficient Kd, the proportion ωs4 allocated to the steering angle control, and the proportion ωb allocated to the braking force control, the value of the target yaw moment Mt allocated to the steering angle control (target yaw moment Mts for the steering angle control), and the value of the target yaw moment Mt allocated to the braking force control (target yaw moment Mtb for the braking force control) are calculated.

Accordingly, as the curve of the road becomes sharper, the value of the target yaw moment allocated to the steering angle control decreases, and the value of the target yaw moment allocated to the braking force control increases. Therefore, the allocation of the target yaw moment Mt to the steering angle control and to the braking force control can be appropriately controlled based on the degree of curve of the road.

Particularly in the illustrated fifth embodiment, in step S210, on the basis of the road radius R, the increase/decrease coefficient Kd of the target yaw moment is calculated. As the curve of the road becomes sharper, the increase/decrease coefficient of the target yaw moment increases. Therefore, as the curve of the road becomes sharper, the yaw moment is increased to stabilize the running movement of the vehicle. This accurately and effectively stabilizes the running movement of the vehicle.

In the illustrated fifth embodiment, in step S220, on the basis of the target yaw moment Mt, the proportion ωs41 for the steering angle control is calculated. The proportion ωs41 for the steering angle control is set to 0 when the target yaw moment Mt is used to suppress the understeer of the vehicle. This avoids the situation where the target yaw moment Mt is unnecessarily allocated to the steering angle control when the vehicle is in the understeer state, and the lateral force of the front wheels cannot be increased. When the target yaw moment Mt is used to suppress the oversteer of the vehicle, the proportion ωs41 for the steering angle control is decreased as the target yaw moment Mt increases. Therefore, as the necessity of suppressing the oversteer increases, the value of the target yaw moment Mt allocated to the braking force control (target yaw moment for the braking force control Mtb) is increased. This effectively suppresses the oversteer of the vehicle.

In the illustrated fifth embodiment, when it is determined that a white line on the road has not been detected in step S35, or when it is determined that the change rate φd of the accelerator pedal operation amount φ is greater than or equal to the reference value φdo, steps S40 to S70 are executed. Therefore, as in the first embodiment, when the driver intends to accelerate the vehicle to a great extent, the vehicle moves according to the driving mode desired by the occupant and the intention of the driver.

Sixth Embodiment

Figure 7A:
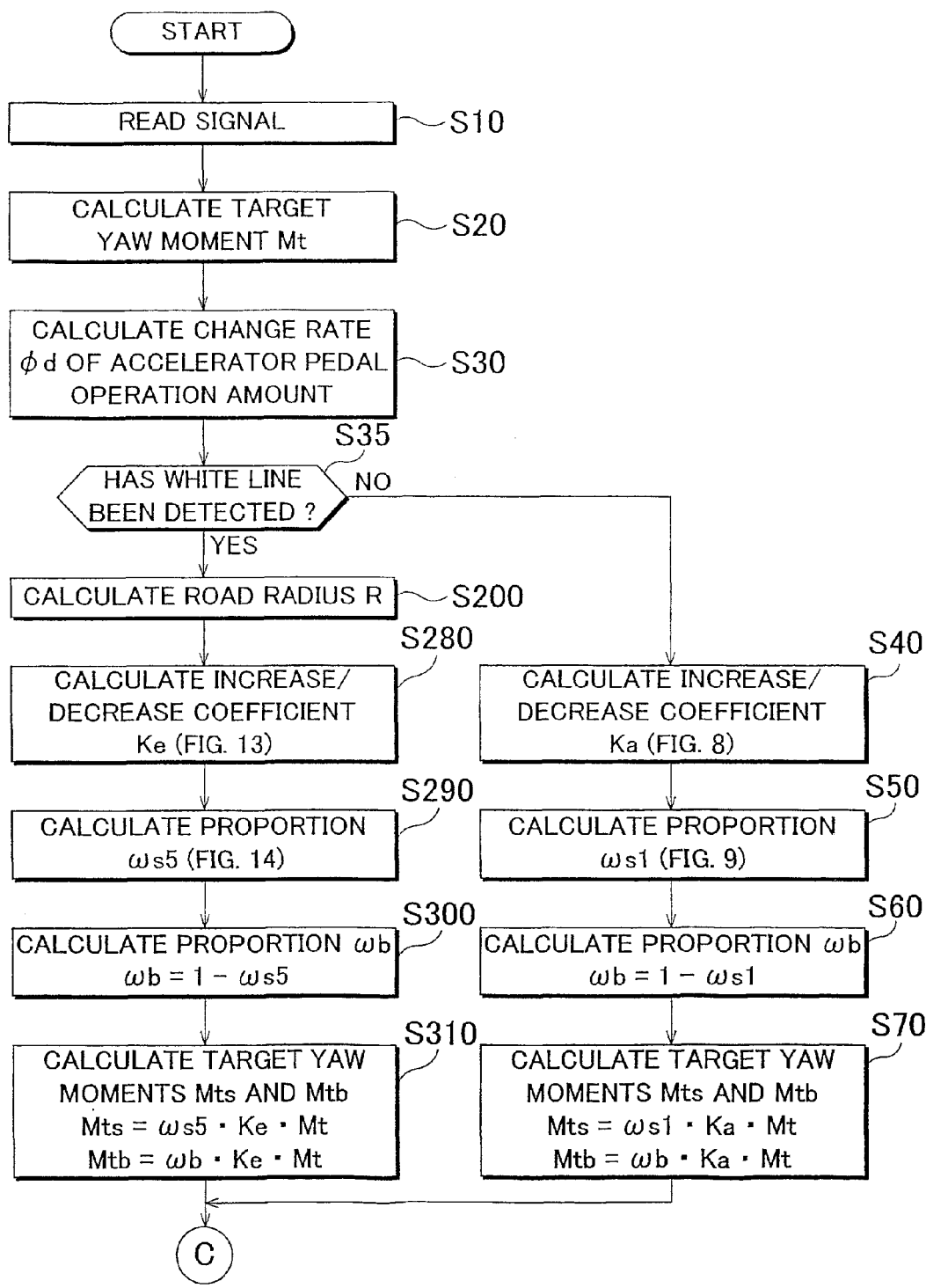

FIGS. 7A and 7B are a flowchart showing a running control routine executed by a running control apparatus for a vehicle according to a sixth embodiment of the invention.

In the sixth embodiment, when electronic control unit 34 receives the signal indicating the acceleration pedal operation amount φ from the accelerator-pedal operation amount sensor 62. The electronic control unit 34 also receives the signal indicating the image information on the scene in front of the vehicle, which is captured by the CCD camera 66, as shown by the two-dot chain line in FIG. 1.

The electronic control unit 34 calculates the change rate φd of the accelerator pedal operation amount φ as in the first embodiment. The electronic control unit 34 also calculates the road radius R as the degree of curve of the road as in the fifth embodiment. Then, on the basis of the change rate φd of the accelerator pedal operation amount φ and the road radius R, the electronic control unit 34 calculates an increase/decrease coefficient Ke used to increase or decrease the target yaw moment Mt and a proportion ωs5 used to allocate the target yaw moment Mt to the steering angle control.

In the sixth embodiment, as shown in FIGS. 7A and 7B, steps S10 to S70, step S200, and steps S400 to S430 are executed in the same manner as in the fifth embodiment. After step S200 is finished, the routine proceeds to step S280.

Figure 13:
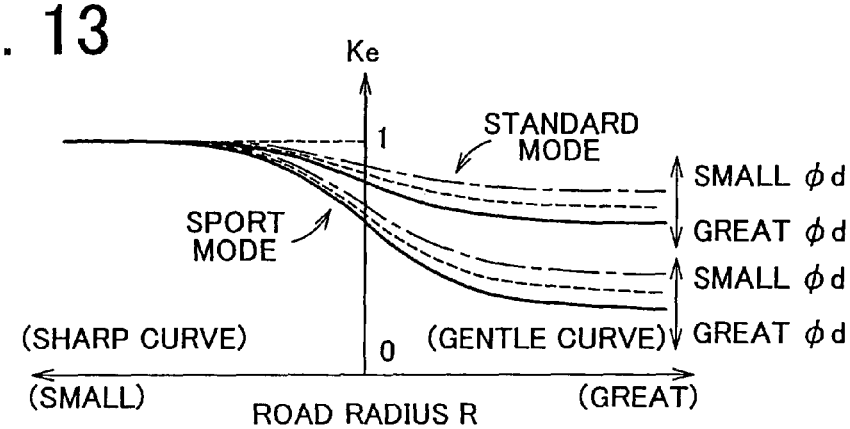
FIG. 13 is a graph showing the relation among the change rate φd of the accelerator pedal operation amount φ, the road radius R, and an increase/decrease coefficient Ke of the target yaw moment.
Figure 14:
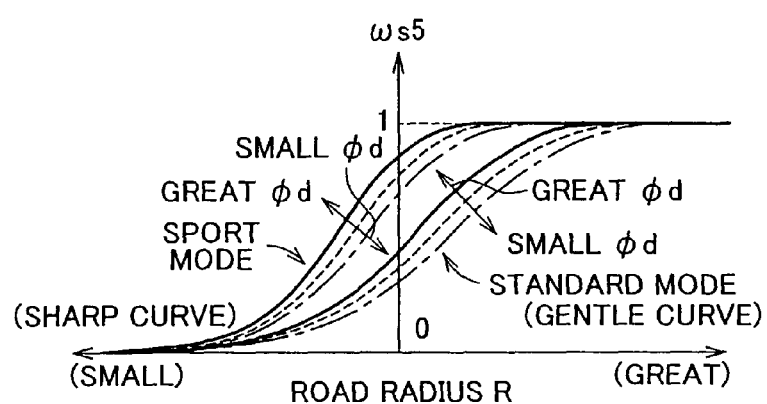
FIG. 14 is a graph showing the relation among the change rate φd of the accelerator pedal operation amount φ, the road radius R, and a proportion ωs5 for the steering angle control.

In step S280, on the basis of the change rate φd of the accelerator pedal operation amount φ and the road radius R, the increase/decrease coefficient Ke of the target yaw moment is calculated using a map corresponding to a graph shown in FIG. 13. In step S290, on the basis of the change rate φd of the accelerator pedal operation amount φ and the road radius R, the proportion ωs5 for the steering angle control is calculated using a map corresponding to the graph shown in FIG. 14.

In step S300, the proportion ωb used to allocate the target yaw moment Mt to the braking force control is calculated by subtracting the proportion ωs5 from 1 (1−ωs5). In step S310, on the basis of the increase/decrease coefficient Ke, the proportion ωs5 for the steering angle control, and the proportion ωb for the braking force control, the value of the target yaw moment Mt allocated to the steering angle control (target yaw moment Mts for the steering angle control) and the value of the target yaw moment allocated to the braking force control (target yaw moment Mtb for the braking force control) are calculated, according to the following equations (13) and (14), respectively.

$$Mts = \omega s5 \times Ke \times Mt \quad (13)$$

$$Mtb = \omega b \times Ke \times Mt \quad (14)$$

In the illustrated sixth embodiment, in steps 35 and 200, the road radius R is calculated as the degree of curve of the road. In step S280, on the basis of the change rate φd of the accelerator pedal operation amount φ and the road radius R, the increase/decrease coefficient Ke of the target yaw moment is calculated. In step S290, on the basis of the change rate φd of the accelerator pedal operation amount φ and the road radius R, the proportion ωs5 of the target yaw moment allocated to the steering angle control are calculated.

In step S300, the proportion ωb for the braking force control is calculated by subtracting the proportion ωs5 from 1 (1−ωs5). In step S310, on the basis of the increase/decrease coefficient Ke, the proportion ωs5 for the steering angle control, and the proportion ωb for the braking force control, the value of the target yaw moment allocated to the steering angle control (target yaw moment Mts for the steering angle control) and the value of the target yaw moment allocated to the braking force control (target yaw moment Mtb for the braking force control) are calculated.

In this case, the proportion ωs5 for the steering angle control in the sport mode is greater than that in the standard mode. Also, when the change rate φd of the accelerator pedal operation amount φ is a positive value, as the change rate φd increases, the proportion ωs5 increases. Therefore, the allocation of the target yaw moment Mt can be appropriately controlled based on the selected driving mode and the driver's intention to accelerate the vehicle.

Particularly in the sixth embodiment, the increase/decrease coefficient Ke of the target yaw moment Mt in the sport mode is smaller than that in the standard mode. Also, when the change rate φd of the accelerator pedal operation amount φ is a positive value, as the change rate φd increases, the increase/decrease coefficient Ke decreases. Therefore, the yaw moment applied to the vehicle can also be appropriately controlled according to the selected driving mode and the driver's intention to accelerate the vehicle.

While the invention has been described with reference to example embodiments thereof, it is to be understood that the invention is not limited to the example embodiments or constructions, and various embodiments can be made within the scope of the invention.

For example, in each of the aforementioned embodiments, the target yaw moment Mt, which is considered as the target turning control amount of the vehicle, is calculated to stabilize the running movement of the vehicle by reducing the deviation Δγ of the actual yaw rate γ from the target yaw rate γt. However, the target yaw moment Mt may be calculated using any method known in the technical field, as long as the target yaw moment Mt used to stabilize the running movement of the vehicle can be obtained.

The fourth embodiment is made by combining the first and second embodiments. The first to third embodiments, and the fifth and sixth embodiments may be combined in any manner. In this case, the proportion ωs used to allocate the target yaw moment Mt to the steering angle control is set to the product of the proportions (e.g., the proportions ωs1 and ωs2) in the combined embodiments, and the increase/decrease coefficient of the target yaw moment is set to the product of the increase/decrease coefficients (e.g., increase/decrease coefficients Ka and Kb) in the combined embodiments.

In the aforementioned fifth and sixth embodiments, the road radius R is calculated as the degree of curve of the road. On the basis of the road radius R, the proportions used to allocate the target yaw moment Mt and the increase/decrease coefficient of the target yaw moment are variably set. However, in each of the aforementioned embodiments, the proportions used to allocate the target yaw moment Mt or the increase/decrease coefficient may be variably set based on the condition of the road other than the degree of curve of the road.

In this case, as the condition of the road other than the degree of curve of the road, it is possible to use, for example, the conditions of the road that are classified based on the frequency with which the acceleration operation or steering operation is performed. The increase/decrease coefficient of the target yaw moment is set to the product of the increase/decrease coefficients (e.g., increase/decrease coefficients Ka and Kb) in the combined embodiments and an increase/decrease coefficient Kr that is set based on the table 2 described below.

TABLE 2

|  | Increase/decrease coefficient Kr |
| --- | --- |
| Road in Urban Area | 1.0 |
| Expressway | 0.8 to 1.0 |
| Mountain Road | 0.8 |
| Race Track | 0 to 0.2 |

In each of the aforementioned embodiments, the increase/decrease coefficient of the target yaw moment is variably set as well as the proportions used to allocate the target yaw moment Mt. Thus, the target yaw moment Mt is increased or decreased as required. However, the variable setting of the increase/decrease coefficient of the target yaw moment may be omitted.

Further, in each of the aforementioned embodiments, the steering-angle changing device 24, which is considered as the steering means, automatically steers the front-left and front-right wheels 10FL and 10FR by rotating the lower steering shaft 26 with respect to the upper steering shaft 22, as required. However, the steering means may have any configuration known in the technical field as long as the steering means steers the steering wheels as required. For example, a steering-angle changing device that increases and decreases the length of the tie-rods 20L and 20R, or a steer-by-wire type steering device may be employed.

The invention claimed is:

1. A running control apparatus for a vehicle, which includes:
   a steering device that steers a steering wheel independently of steering operation performed by a driver;
   a braking/driving force control device controls that controls braking/driving force for each wheel;
   a calculation device that calculates a target turning control amount of the vehicle to stabilize running movement of the vehicle;
   a division device that divides the target turning control amount into a target turning control amount allocated to a control of a steering angle of the steering wheel and a target turning control amount allocated to a control of the braking/driving force in predetermined proportions;
   a control device that controls the steering device based on the target turning control amount allocated to the control of the steering angle of the steering wheel and controls the braking/driving force control device based on the target turning control amount allocated to the control of the braking/driving force; and
   a detection device that detects an amount of acceleration operation performed by the driver,
   wherein the division device increases a proportion of the target turning control amount allocated to the control of the steering angle of the steering wheel and decreases a proportion of the target turning control amount allocated to the control of the braking/driving force, as a rate of increase in the amount of acceleration operation increases, and
   wherein the braking/driving force includes at least one of a braking force and a driving force.

2. The running control apparatus according to claim 1, wherein the calculation device decreases the target turning control amount as the rate of increase in the amount of acceleration operation increases.

3. The running control apparatus according to claim 1, wherein when the amount of acceleration operation is not increased, the division device sets the proportion of the target turning control amount allocated to the control of the steering angle of the steering wheel to zero.

4. The running control apparatus according to claim 1, wherein the rate of increase in the amount of acceleration operation is a change rate of an accelerator pedal operation amount.

5. The running control apparatus according to claim 1, wherein the division device controls the proportions of the target turning control amount allocated to the control of the steering angle of the steering wheel and the target turning control amount allocated to the control of the braking/driving force, taking into account a condition of a road on which the vehicle is running.

6. The running control apparatus according to claim 5, wherein the division device decreases a value of the target turning control amount allocated to the steering angle, as a curve of the road becomes sharper.

7. The running control apparatus according to claim 5, wherein the condition of the road is a degree of curve of the road.

8. The running control apparatus according to claim 1, wherein:
   the division device calculates the proportion for the steering angle control on the basis of a target yaw moment;
   the division device sets the proportion for the steering angle control to 0 when the target yaw moment is used to suppress an understeer of the vehicle; and
   the division device decreases the proportion for the steering angle control, as the target yaw moment increases when the target yaw moment is used to suppress the oversteer of the vehicle.

9. The running control apparatus according to claim 1, wherein the calculation device increases the target turning control amount, as a curve of a road becomes sharper.

10. The running control apparatus according to claim 1, wherein the calculation device includes device that calculates a target turning condition amount of the vehicle, and device that detects an actual turning condition amount of the vehicle; and the calculation device calculates a target yaw moment of the vehicle as the target turning control amount, based on a deviation of the actual turning condition amount from the target turning condition amount.

11. The running control apparatus according to claim 1, wherein the steering device steers the steering wheel with respect to a steering operation element operated by the driver, thereby steers the steering wheel independently of the steering operation performed by the driver.

12. The running control apparatus according to claim 1, wherein the braking/driving force control device includes device that individually controls braking force for each wheel, and the braking/driving force control device controls the braking force for each wheel, thereby controls the braking/driving force for each wheel.

13. The running control apparatus according to claim 1, wherein the division device allocates all of the target yaw moment of the vehicle to the control of the braking/driving force when a target yaw moment of the vehicle is used to suppress drift-out of the vehicle.

14. The running control apparatus according to claim 1, wherein the division device increases the proportion of a target yaw moment allocated to the control of the braking/driving force as the target yaw moment of the vehicle increases when the target yaw moment is used to suppress spin of the vehicle.

15. The running control apparatus according to claim 1, wherein the calculation device increases or decreases the target turning control amount based on a condition of a road.

16. The running control apparatus according to claim 15, wherein the condition of the road includes conditions of the road classified based on a frequency with which the acceleration operation or steering operation is performed.

17. The running control apparatus according to claim 1, wherein the proportion of the target turning control amount allocated to the control of the steering angle of the steering wheel is gradually increased as a rate of increase in the amount of acceleration operation increases.

* * * * *